(12) United States Patent
Belchior et al.

(10) Patent No.: US 12,434,185 B2
(45) Date of Patent: Oct. 7, 2025

(54) PROCESS FOR CAPTURING CO2 AND PROCESS FOR CONTINUOUSLY REGENERATING SOLVENT

(71) Applicants: UNIVERSIDADE FEDERAL DE MINAS GERAIS, Belo Horizonte (BR); PETROLEO BRASILEIRO S.A.-PETROBRAS, Rio de Janeiro (BR); FUNDACAO DE AMPARO A PESQUISA DO ESTADO DE MINAS GERAIS-FAPEMIG, Belo Horizonte (BR); FCA FIAT CHRYSLER AUTOMOVEIS BRASIL LTDA, Betim (BR)

(72) Inventors: Jadson Claudio Belchior, Belo Horizonte (BR); Geison Voga Pereira, Belo Horizonte (BR); Plinio Cesar De Carvalho Pinto, Sao Mateus (BR); Thais Vieira Batista, Belo Horizonte (BR); Pedro Caffaro Vicentini, Rio de Janeiro (BR); Luciana Neves Loureiro, Rio de Janeiro (BR)

( * ) Notice: Subject to any disclaimer, the term of this patent is extended or adjusted under 35 U.S.C. 154(b) by 1087 days.

(21) Appl. No.: 17/414,647

(22) PCT Filed: Dec. 17, 2019

(86) PCT No.: PCT/BR2019/050543
§ 371 (c)(1),
(2) Date: Nov. 24, 2021

(87) PCT Pub. No.: WO2020/124184
PCT Pub. Date: Jun. 25, 2020

(65) Prior Publication Data
US 2023/0302400 A1  Sep. 28, 2023

(30) Foreign Application Priority Data
Dec. 20, 2018 (BR) .......................... 102018076758-5

(51) Int. Cl.
*B01D 53/62* (2006.01)
*B01D 53/14* (2006.01)
*B01D 53/78* (2006.01)
*B01D 53/96* (2006.01)

(52) U.S. Cl.
CPC ..... *B01D 53/1493* (2013.01); *B01D 53/1425* (2013.01); *B01D 53/1475* (2013.01); *B01D 53/62* (2013.01); *B01D 53/78* (2013.01); *B01D 53/96* (2013.01); *B01D 2251/306* (2013.01); *B01D 2251/604* (2013.01); *B01D 2252/103* (2013.01); *B01D 2252/202* (2013.01); *B01D 2252/504* (2013.01); *B01D 2257/504* (2013.01)

(58) Field of Classification Search
None
See application file for complete search history.

(56) References Cited

U.S. PATENT DOCUMENTS

| | | |
|---|---|---|
| 7,604,724 B2 | 10/2009 | Mortson |
| 7,964,170 B2 | 6/2011 | Singh |
| 2013/0115151 A1 | 5/2013 | Miklos Ilkovics |

FOREIGN PATENT DOCUMENTS

| | | | | |
|---|---|---|---|---|
| EP | 1201290 A1 | 5/2002 | | |
| GB | 2205327 A | * 12/1988 | ......... | B01D 53/1456 |
| WO | 2011/122925 A1 | 10/2011 | | |
| WO | 2013/157912 A1 | 10/2013 | | |

OTHER PUBLICATIONS

English Translation of International Search Report in International Application No. PCT/BR2019/050543, dated Feb. 28, 2020.

* cited by examiner

*Primary Examiner* — Daniel Berns
(74) *Attorney, Agent, or Firm* — RAPHAEL BELLUM PLLC

(57) ABSTRACT

The present invention describes a process for capturing $CO_2$ using an optimized mixture of water and alcohols with alkali hydroxides, such as KOH and NaOH, for absorption of $CO_2$ from gaseous mixtures. The process shows high efficiency and low volatility and corrosivity rate of the solvent, in addition to allowing cost reduction for installation and maintenance of reactors and reducing solvent loss. The present invention also describes a process for regenerating solvent or its reuse, carried out by chemical precipitation, continuously and not in batch, through the reaction with alkaline earth oxides, such as CaO and MgO, and/or alkaline earth hydroxides, such as $Ca(OH)_2$ and $Mg(OH)_2$, for the formation of carbonates, such as $CaCO_3$ and $MgCO_3$, which can be discarded in nature without any environmental issue or can be used commercially in industry or agriculture.

7 Claims, 1 Drawing Sheet

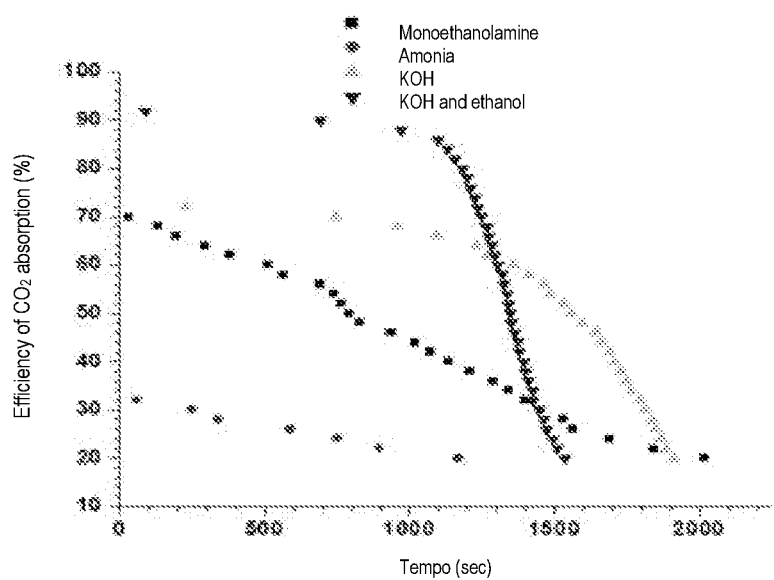

PROCESS FOR CAPTURING CO2 AND PROCESS FOR CONTINUOUSLY REGENERATING SOLVENT

The present invention refers to process for capturing $CO_2$ using an optimized mixture of water and alcohols with alkali hydroxides, such as KOH and NaOH, for absorption of $CO_2$ from gaseous mixtures. The process shows high efficiency and low volatility and corrosivity rate of the solvent, in addition to allowing cost reduction for installation and maintenance of reactors and reducing solvent loss. The present invention also describes a process for regenerating solvent or its reuse, carried out by chemical precipitation, continuously and not in batch, through the reaction with alkaline earth oxides, such as CaO and MgO, and/or alkaline earth hydroxides, such as $Ca(OH)_2$ and $Mg(OH)_2$, for the formation of carbonates, such as $CaCO_3$ and $MgCO_3$, which can be discarded in nature without any environmental issue or can be used commercially in industry or agriculture.

The search for decreasing $CO_2$ emissions into the atmosphere has received a lot of attention in the context of environmental preservation. This is because the concentration of carbon dioxide has increased by about 45% since the beginning of industrial activities, with the burning of fossil fuels being its main source, contributing a lot to the rise in global temperature. This effect occurs because $CO_2$ participates in the greenhouse effect, the Earth's natural warming process, which has become exaggerated with the increase in emissions. Since the Industrial Revolution, the increase in temperature has averaged 0.8° C. per year. (NASA. Effects of Changing the Carbon Cycle. Disponível em: http://www.earthobservatory.nasa.gov). The consequences of this increase include melting glaciers, rising sea levels, disruption of natural habitat and the extinction of many species.

There are many alternatives to capture carbon dioxide produced by industries, which can be divided into three categories: pre-combustion, in which water vapor and oxygen gas react with fuels to form CO, $H_2$, $CO_2$ and $CH_4$; oxy-combustion, in which combustion is carried out using only $O_2$, forming water and $CO_2$ in high concentration; and post-combustion, in which atmospheric air promotes combustion, producing a mixture with a low concentration of $CO_2$.

With regard to post-combustion, the most used and mature process on a commercial scale, and which is still the subject of intense research, is that of absorption by aqueous amine solutions. In the same, the liquid phase and $CO_2$ are subjected to flows with opposite directions, meeting for the processing of the reaction in cylindrical vertical columns. (PINTO, P.C.C.; Carbonatação mineral de resíduos sólidos contendo cálcio: escórias de aciaria, pó de forno de clínquer, gesso da construção civil, fosfogesso e gesso da dessulfurização de gases de exaustão. 195 p. Tese—Química, Universidade Federal de Minas Gerais, 2015).

Following this step, there is the solution regeneration process, which greatly increases the costs of the process. More than 70% of the cost of $CO_2$ capture is related to energy consumption in the solvent regeneration step. This is because it is necessary that the process be carried out at temperatures above 100° C., for the decomposition of hydrogen carbonate ions, and that a stream of pure $CO_2$ and unsaturated solvent be released, so that it can be reused in the absorption of $CO_2$. In addition, aqueous amine solutions have several disadvantages such as: low thermal stability, degradation of amines by oxidation and reaction with gas impurities such as sulfur oxides and nitrogen oxides, in addition to the high corrosion rate of equipment contacting the solution (LIANG, Z; FU, K; IDEM, R; TONTIWACHWUTHIKUL, P. Review on current advances, future challenges and consideration issues. Chinese Journal of Chemical Engineering. v. 24, p. 278-288, 2016).

As an alternative to amines, aqueous ammonia solutions are considered, with lower acquisition cost and greater absorption capacity (YANG, N. et al. Post Combustion $CO_2$ Capture. OGST—Oil & Gas Science and Technology—Journal. v. 69, p. 930-945, 2014.). On the other hand, ammonia volatility and low absorption rate represent major disadvantages of this process. To get around the issue of volatility, the CAP (Chilled Ammonia Process) was developed, in which carbon dioxide is absorbed at low temperatures (MOLINA, C. T.; BOUALLOU, C. Assessment of different methods of $CO_2$ capture in post-combustion using ammonia as solvent. Journal Of Cleaner Production. v. 103, p. 463-468, 2015).

Many efforts have been made to optimize these capture processes. The patent document CN104772021, entitled "Method for capture of $CO_2$ in industrial gas by polyolethylenediamine aqueous solution", describes a process of capture by aqueous solution of ethylenediamine, using a polyol as a fixing agent to prevent the loss of amines in the process. In this process, regeneration involves energy expenditure with heating the solution, and must be carried out at temperatures between 90° C. and 130° C. Furthermore, the absorption process is carried out at pressures greater than atmospheric.

Patent document US2014178279, entitled "Amine absorbent and a method for $CO_2$ capture", describes the absorption process by mixing two or more types of amines, aiming at the formation of two phases after absorption, one being rich in $CO_2$ and another with low concentration/absence of carbon dioxide. Thus, only the part rich in $CO_2$ needs to be regenerated, reducing process costs. Despite this, the process still does not solve the problem of corrosivity and low thermal stability of amines.

The patent document US20110116997, entitled "Improved alkanolamines for $CO_2$ removal from gas streams" describes the use of alkanolamine solution, namely: 3-piperidinemethanol, tricine, 3-quinuclidinyl, 3-piperidino-1,2-propanediol and salts thereof. These show high absorption capacity, with good maintenance of this capacity during the capture and regeneration cycles, and greater stability against high temperatures. However, the expenses with the solution regeneration step are still high.

The patent document WO2012034921, entitled "A process for the separation and capture of $CO_2$ from gas mixtures using amine solutions in anhydrous alcohols", describes the use of amine solutions in alcohols for the capture of $CO_2$. The process allows obtaining a high absorption rate and performing the gas capture by the solution at low temperatures, between 20° C. and 40° C., and regeneration between 50° C. and 80° C. In the process, carbon dioxide reacts with 2-amino-2-methyl-1-propanol, forming an alkyl carbonate, which is unstable and, therefore, decomposes at temperatures lower than the hydrogen carbonates formed in the capture by aqueous solutions of amines. This process reduces the operational cost of absorption and regeneration, due to the lower temperatures used in the reactors, but it does not solve the problem of amine degradation. The concentration of amines is high (2.0 mol/L) and contributes to increase the corrosivity of the solution. The solution saturation time is very fast, since carbonic acid ions are poorly soluble in alcohols. This implies in reactor projects that can be more complex, with greater investment and less operational efficiency.

Processes that do not use amines and ammonia, but solutions containing hydroxides, have also been studied. Documents related to the subject were found in the state of the art.

The patent document WO2008018928, entitled "Carbon dioxide capture and related processes", describes the possibility of using hydroxides to capture $CO_2$ from industrial plants or from the atmosphere. For the production of these hydroxides, a treatment is made in aqueous solutions of salts, producing the desired alkaline solution, which will react with carbon dioxide to form a carbonate. From the initial solution, gaseous elements will also be produced, such as $Cl_2$, from NaCl, and $H_2$, or any other acidic solution, which can be used for other applications.

Also, the patent document WO2011122925, entitled "Process for the removal of acid gases from the air and from combustion gases from burners and internal combustion engines by means of absorption with sodium hydroxide solution and process for obtaining sodium carbonate in order to acquire carbon credits", in which a capture process for acid gases is described, a category that includes carbon dioxide, using an aqueous solution of 8% sodium hydroxide, which is sprayed perpendicularly into a horizontal flow of gas. In the case of $CO_2$, sodium carbonate is formed, which can be used for other applications. Solution regeneration has a high cost with energy consumption, due to the thermal stability of sodium carbonate, which requires a temperature above 800° C. for its decomposition.

The article entitled "Advance in Post-combustion $CO_2$ capture with alkaline solution: a brief review", published in 2012, describes $CO_2$ absorption processes, including the process using aqueous alkali hydroxide solvents, already widely known in the state of the art. However, the process described in this article does not include the addition of alcohols to the process, which generates a result with low absorption of $CO_2$ from the solvent, high regeneration temperature and high cost of the solvent regeneration process, in addition to presenting equipment corrosion and solvent-induced steel pipes (Peng Y., Zhao B., Li L. Advance in Post-combustion $CO_2$ capture with alcaline solution: a brief review. Energy Procedia 14, 1515-1522, 2012).

The article entitled "Laboratory-scale experiment on a novel mineralization-based method of $CO_2$ capture using an alkaline solution", published in 2017, describes a process in which aqueous solutions of alkaline hydroxides can be regenerated by precipitation of carbonate ions. However, the process proposed in this article is discontinuous, inefficient and requires several steps, which contributes to increase installation and industrial operation costs. An aqueous solution of calcium oxide is added to the $CO_2$ saturated solvent to precipitate the carbonate ions, to be removed by filtration. The precipitate formed in the first step is not calcium carbonate as expected, but sodium bicarbonate or carbonate or potassium carbonate because of the high concentration of alkali hydroxide. Therefore, in the first stage of the work, regeneration was not carried out. In the second step of solvent reuse, calcium carbonate is obtained for solvent regeneration, but the solvent has a low absorption efficiency of $CO_2$ due to the precipitation of alkaline bicarbonates and carbonates in the first step, which reduced the concentration of base (Park S., Song K., Jo H. Laboratory-scale experiment on a novel mineralization-based method of $CO_2$ capture using alkaline solution. Energy 124, 589-598, 2017).

The present invention consists of a complete process of absorption of $CO_2$ and solvent regeneration based on alkali hydroxides in a mixture of water and alcohols with an absorption of $CO_2$ much higher than aqueous solutions of alkali hydroxides or amines. Solvent regeneration is continuous, efficient and carried out in a single step by an alkaline carbonate formation process.

The present invention describes the use of an optimized mixture of water and alcohols with alkali hydroxides such as KOH and NaOH for absorption of $CO_2$ from gas mixtures with high efficiency and with a low rate of volatility and solvent corrosivity, so that the investment in the installation and reactor maintenance and solvent loss are reduced. Further, the process for regenerating solvent or its reuse, carried out by chemical precipitation, continuously and not in batch, through the reaction with alkaline earth oxides, such as CaO and/or MgO, and/or alkaline earth hydroxides, such as $Ca(OH)_2$ and $Mg(OH)_2$, for the formation of carbonates, such as $CaCO_3$ e $MgCO_3$, which can be discarded in nature without any environmental issue or can be used commercially in industry or agriculture.

There are several applications for calcium carbonate and magnesium carbonate produced in the process of the present invention. Among them, we can mention: flux in steelmaking, calcium source in the production of Portland cement and in the manufacture of glass, source of nutrients and soil acidity corrector in agriculture and raw material in the production of lime and magnesium oxide. Chemical regeneration of the solvent can be carried out at atmospheric pressure and at a temperature close to room temperature, which reduces the investment in reactor installation and the cost of heating energy.

The chemical absorption of $CO_2$ in the present invention is carried out by the direct contact of the chemical solvent with the gas mixture, where the solubilization of $CO_2$ in the solvent occurs and the direct passage of the other gases from the gas mixture without interacting with the solvent, thus promoting the separation of the $CO_2$ from the gas mixture. The solubilization of $CO_2$ in the chemical solvent is favored at the solvent interface (liquid-gas) through a surface layer of alkoxides, which act as surfactants, chemically interacting with the polar phase (aqueous) and the nonpolar phase (gases such as $CO_2$). With the formation of carbonic acid, it quickly dissociates due to the presence of hydroxide and alkoxide ions, which act as bases in the chemical solvent. The greater the solubilization of $CO_2$ in the chemical solvent, the greater the efficiency of separating $CO_2$ from the gas mixture. This can be achieved by the direct interaction of the gas mixture with the chemical solvent in bubbling reactors, solvent spray reactors, wet column reactors, fixed packed column reactors, rotary column reactors, among others known in the state of the art. The flow of the gas mixture in countercurrent to the chemical solvent in the chemical absorption reactor favors the phenomenon of mass and heat transfer and increases the efficiency of the chemical absorption reactor.

Continuous regeneration of the solvent by chemical precipitation is accomplished by circulating the solvent in a fixed bed of alkaline earth oxide particles such as: calcium oxide, magnesium oxide, strontium oxide and barium oxide, and/or alkaline earth hydroxides such as hydroxide calcium, magnesium hydroxide, strontium hydroxide and barium hydroxide, which can promote the formation of insoluble carbonates and thus capture the carbonate and hydrogen carbonate ions present in the chemical solvent after the solubilization of $CO_2$. This makes it possible to reuse the solvent in other cycles of chemical absorption of $CO_2$. The particles of alkaline earth oxides and/or hydroxides can be formed by spheres, semi-spheres, pellets and other shapes, which allow the continuous flow of the chemical solvent through the fixed bed without clogging the regenerator.

Particles of alkaline earth oxides and/or hydroxides with greater surface area favor the regeneration efficiency, due to the greater contact surface of the particles with the chemical solvent. The chemical solvent circulation in the regenerator must be carried out at a temperature between 20° C. and 85° C., preferably between 20° C. and 60° C.

Once saturated with insoluble carbonates, the fixed bed of alkaline earth oxides and/or hydroxides of the regenerator must be replaced by a new unsaturated material. Saturated material rich in carbonates can be disposed of in nature directly into the soil or marketed for other purposes such as agriculture and industry. Another possibility is to calcine the saturated material to decompose magnesium carbonate above 400° C. and calcium carbonate above 800° C. This alternative recovers the bed material so that it can be reused, but releases $CO_2$ to atmosphere, which had been captured in the chemical absorption process. It is a technically viable process, but it contributes to increasing anthropogenic emissions of $CO_2$ into the atmosphere and causing global warming and climate change.

BRIEF DESCRIPTION OF THE FIGURES

FIG. 1 is a graphic demonstration of the efficiency of the chemical absorption process of $CO_2$ as a function of time using the following aqueous solutions: monoethanolamine (black), ammonia (red), potassium hydroxide (green) and potassium hydroxide containing ethanol (95% water and 5% ethanol—blue). All solutions were used at a concentration of 1 mol/L.

DETAILED DESCRIPTION OF THE TECHNOLOGY

The present invention describes a process for capturing $CO_2$ using an optimized mixture of water and alcohols with alkali hydroxides, such as KOH and NaOH, for absorption of $CO_2$ from gaseous mixtures. The process shows high efficiency and with low volatility and corrosivity rate of the solvent, in addition to allowing cost reduction for installation and maintenance of reactors and reducing solvent loss. The present invention also describes a process for regenerating solvent or its reuse, carried out by chemical precipitation, continuously and not in batch, through the reaction with alkaline earth oxides, such as CaO and MgO, and/or alkaline earth hydroxides, such as $Ca(OH)_2$ e $Mg(OH)_2$, for the formation of carbonates, such as $CaCO_3$ e $MgCO_3$, which can be discarded in nature without any environmental issue or can be used commercially in industry or agriculture.

The process for capturing $CO_2$ comprises the following steps:
a. Preparing a hydroalcoholic solution with alcohol at a concentration of 2.5%-75% v/v, preferably 10% v/v;
b. Preparing a mixture of the solution obtained in step "a" with alkali hydroxides, whose concentration should be between 0.5 mol/L to 2 mol/L, preferably 1 mol/L;
c. Placing the aqueous mixture obtained in step "b" in direct contact with the gas mixture containing $CO_2$, thus promoting the separation of $CO_2$ from the gas mixture.

The alcohol used in step "a" of the process for capturing $CO_2$ can be selected from the group comprising methanol, ethanol, isopropanol, tert-butanol, glycerol and ethylene glycol. Furthermore, alkali hydroxides can be selected from the group comprising sodium hydroxide, potassium hydroxide and lithium hydroxide. In step "c" of the process for capturing $CO_2$, the temperature of the chemical absorption reaction can be between 10° C. and 85° C., preferably between 20° C. and 40° C. The process for capturing $CO_2$ can be carried out in a chemical absorption reactor under pressure between 1 atm to 10 atm, preferably 1 atm.

The process for continuous solvent regeneration is carried out by chemical precipitation and comprises the following steps:
a. Placing particles of alkaline earth oxides and/or hydroxides at a concentration of 90% m/m to 100% m/m purity, preferably 100% m/m, in a bed;
b. Placing the solvent containing $CO_2$ in contact with the bed of alkaline earth oxides and/or hydroxides particles inserted in step "a";
c. Recirculating the solvent containing $CO_2$ in a bed of alkaline earth oxides and/or hydroxides particles, for 10 to 300 minutes, preferably 10 minutes.

The bed of particles of the continuous solvent regeneration process is preferably a fixed bed. The continuous regeneration of solvent by chemical precipitation can be accomplished circulating the solvent in a bed of alkaline earth oxide particles selected from the group: calcium oxide, magnesium oxide, strontium oxide and barium oxide, and/or alkaline earth hydroxides such as calcium hydroxide, magnesium hydroxide, strontium hydroxide and barium hydroxide.

The particles of alkaline earth oxides and/or hydroxides can be in the form of spheres, semi-spheres, pellets and other shapes, which allow the continuous flow of the chemical solvent through the bed without clogging the regenerator.

The circulation of chemical solvent in the regenerator of the continuous solvent regeneration process can be carried out at a temperature between 20° C. and 85° C., preferably between 20° C. and 60° C.

The present invention can be better understood by the following, non-limiting example. cl Example 1—Chemical Absorption of $CO_2$ in Mixtures of $CO_2$ with Atmospheric Air by Chemical Solvent Composed of a Mixture of 95% v/v Water, 5% v/v Ethanol and 1 mol/l Potassium Hydroxide and Regeneration Process by Chemical Precipitation The chemical absorption of $CO_2$ was carried out bubbling through a Dreschel type flask, at a flow rate of 8 L/min, a mixture of 5% v/v of $CO_2$ and 95% v/v of compressed air in 250 mL of chemical solvent containing 95% v/v water, 5% v/v ethanol and 1 mol/L potassium hydroxide. The gas mixture was analyzed instantly by an infrared detector to quantify the chemical absorption of $CO_2$ by the chemical solvent. Chemical absorption was carried out at room temperature (25° C.). The same procedure was performed for other solvents in order to compare the chemical absorption efficiency of $CO_2$. FIG. 1 shows the chemical absorption of $CO_2$ by different solvents. It can be seen in FIG. 1 that the aqueous ammonia solution with a concentration of 1 mol/L has the lowest $CO_2$ absorption efficiency of all tested solvents. The aqueous monoethanolamine solution has an initial $CO_2$ absorption efficiency similar to the aqueous potassium hydroxide solution, where approximately 70% of the $CO_2$ of the gas mixture is solubilized when in contact with the solvent. However, the rate of change of the $CO_2$ absorption efficiency is different for the two solvents. The aqueous solution of monoethanolamine shows a loss of efficiency since the beginning of the experiment, and at a rate of decay of the efficiency of absorption of $CO_2$ less variable than that of the aqueous solution of potassium hydroxide. The solvent that shows potassium hydroxide at a concentration of 1 mol/L in 95% water and 5% ethanol is the most efficient in absorbing $CO_2$ from gas mixtures. The efficiency is greater than 90% at room temperature and extends over a long period until the solvent saturates with $CO_2$ and reduces its absorption efficiency sharply. The chemical reactions that occur in chemical absorption are described in Equations 1 to 8.

$$CH_3CH_2OH(aq)+KOH(aq) \rightarrow CH_3CH_2O^-K^+(aq)+H_2O\,(l) \quad \text{Eq. 1}$$

$$CO_2(g)+H_2O(l) \rightarrow H_2CO_3(aq) \quad \text{Eq. 2}$$

$$H_2CO_3(aq)+H_2O(l) \rightarrow HCO_3^-(aq)+H_3O^+(aq) \quad \text{Eq. 3}$$

$$H_2CO_3(aq)+OH^-(aq) \rightarrow HCO_3^-(aq)+H_2O(l) \quad \text{Eq. 4}$$

$$H_2CO_3(aq)+CH_3CH_2O^-(aq) \rightarrow HCO_3^-(aq)+CH_3CH_2OH(aq) \quad \text{Eq. 5}$$

$$HCO_3^-(aq)+H_2O(l) \rightarrow CO_3^{2-}(aq)+H_3O^+(aq) \quad \text{Eq. 6}$$

$$HCO_3^-(aq)+OH^-(aq) \rightarrow CO_3^{2-}(aq)+H_2O(l) \quad \text{Eq. 7}$$

$$HCO_3^-(aq)+CH_3CH_2O^-(aq) \rightarrow CO_3^{2-}(aq)+CH_3CH_2OH(aq) \quad \text{Eq. 8}$$

The presence of the ethoxide ion in synergy with the hydroxyl ion in the aqueous solution promotes a significant increase in the efficiency of $CO_2$ absorption, when compared to the aqueous solution of monoethanolamine at the same concentration of the reagent.

The regeneration by chemical precipitation was carried out by percolating through a metering pump the saturated solvent at a flow rate of 15 L/h over a fixed bed of 10 cm height of calcium hydroxide semispheres of 8 mm in diameter. The regeneration efficiency is followed by acid titration of the solvent and fixed bed material, to quantify the carbonate soluble in the solvent and insoluble in the fixed bed. Regeneration by chemical precipitation was carried out at room temperature (25° C.). It was observed that the regeneration is not immediate, but that it occurs significantly to promote the reuse of the solvent in chemical absorption after 15 min of percolation of the saturated solvent on the fixed bed containing calcium hydroxide semispheres.

The chemical regeneration of the solvent takes place through the following reactions (Equations 9 and 10):

$$Ca(OH)_2\,(aq)+CO_3^{2-}(aq) \rightarrow CaCO_3\,(s)+2\,OH^-(aq) \quad \text{Eq. 9}$$

$$Ca(OH)_2(aq)+HCO_3^-(aq) \rightarrow CaCO_3(s)+OH^-(aq)+H_2O\,(l) \quad \text{Eq. 10}$$

The invention claimed is:

1. A process for capturing $CO_2$, characterized by using alkaline chemical solvent, water, and alcohols, comprising the following steps:
   (a) preparing a hydroalcoholic solution consisting of water and at least one alcohol at a concentration of 2.5%-75% v/v;
   (b) preparing a mixture consisting of the hydroalcoholic solution obtained in step (a) and at least one alkali hydroxide, wherein the concentration of alkali hydroxide in the mixture is 0.5 mol/L to 2 mol/L;
   (c) placing the mixture obtained in step (b) in direct contact with a gas mixture containing $CO_2$, thus promoting the separation of $CO_2$ from the gas mixture containing $CO_2$.

2. The process for capturing $CO_2$ according to claim 1, wherein in step (a the at least one alcohol is selected from the group consisting of methanol, ethanol, isopropanol, tert-butanol, glycerol, and ethylene glycol.

3. The process for capturing according to claim 1, wherein in step (b) the at least one alkali hydroxide is selected from the group consisting of sodium hydroxide, potassium hydroxide, and lithium hydroxide.

4. The process for capturing according to claim 1, wherein the at least one alcohol in the hydroalcoholic solution is present at a concentration of 10% v/v.

5. The process for capturing according to claim 1, wherein in step (b) the concentration of alkali hydroxide in the mixture is 1 mol/L.

6. The process for capturing according to claim 1, wherein step (c) is performed between 10° C. and 85° C.

7. The process for capturing according to claim 1, wherein the process is carried out in a chemical absorption reactor under pressure between 1 atm to 10 atm.

* * * * *